United States Patent
Hsu

[19]

[11] Patent Number: 5,823,660
[45] Date of Patent: Oct. 20, 1998

[54] AUTOMATIC LIGHTING CONTROL DEVICE FOR A DECORATIVE LIGHT STRING

[76] Inventor: Yuan-Shun Hsu, No. 910, Fu-Hsing Rd., Chu-Pei City, Hsing Chu Hsien, Taiwan

[21] Appl. No.: 611,491

[22] Filed: Mar. 5, 1996

[51] Int. Cl.⁶ .................................................. H05B 37/00
[52] U.S. Cl. ...................... 362/276; 362/802; 362/249; 250/227.11; 250/239; 250/214 AL
[58] Field of Search ..................... 362/276, 802, 362/249, 250, 391, 806; 250/239, 227.11, 214 AL, 205

[56] References Cited

U.S. PATENT DOCUMENTS

| | | | |
|---|---|---|---|
| 3,273,012 | 9/1966 | Rosenblum | 250/239 |
| 3,433,967 | 3/1969 | Bernheim | 250/239 |
| 3,496,422 | 2/1970 | Horowitz | 250/239 |
| 3,653,021 | 3/1972 | Litman et al. | 250/239 |
| 4,023,035 | 5/1977 | Rodriguez | 250/239 |
| 4,791,290 | 12/1988 | Noone et al. | 250/239 |
| 5,428,518 | 6/1995 | Huang | 362/391 |
| 5,455,488 | 10/1995 | Rhoades et al. | 315/156 |
| 5,585,697 | 12/1996 | Cote et al. | 362/802 |

Primary Examiner—Thomas M. Sember
Attorney, Agent, or Firm—Bacon & Thomas

[57] ABSTRACT

An automatic lighting control device installed in a decorative light string is controlled by the intensity of ambient light detected by a photo-electric control device, the latter being shaped like a lamp bulb. The device includes hollow base installed in a lamp socket of the decorative light string which holds the photo-electric control device. The base has a ring contact and a tip contact insulated from the ring contact for connection to the two opposite terminals of the lamp socket. A cover is located on the base and a transparent cap is fastened to the cover to let outside light pass to the photo-electric control device.

2 Claims, 3 Drawing Sheets

AUTOMATIC LIGHTING CONTROL DEVICE FOR A DECORATIVE LIGHT STRING

BACKGROUND OF THE INVENTION

The present invention relates to an automatic lighting control device for automatically controlling the operation of a decorative light string through detecting the intensity of ambient light by means of a photo-electric control device.

Regular decorative light strings are used to decorate trees, buildings, and any of a variety of objects, and are controlled manually to give off light. There are also known/photo-electric control devices for automatically turning on/off decorative light strings subject to the intensity of ambient light. Conventional photo-electric control devices for this purpose are commonly comprised of a caselike shell and a photo-electric control circuit mounted inside the shell. These devices are made with the decorative light strings the factory. These photoelectric control devices affect the sense of beauty of the decorative light strings. Furthermore, when the photo-electric control device of a decorative light string is damaged, it cannot be conveniently disconnected from the circuit of the decorative light string and replaced.

SUMMARY OF THE INVENTION

It is one object of the present invention to provide an automatic lighting control device which can be detachably installed in the decorative light string to control its operation to—through detecting—the intensity of ambient light by means of a photo-electric control device. It is another object of the present invention to provide an automatic lighting control device for controlling the operation of a decorative light string which is shaped like a lamp bulb and can be directly installed in the lamp socket of any of a variety of decorative light strings. To achieve these objects, there is provided an automatic lighting control device which comprises a body shaped like a lamp bulb and a photo-electric control device mounted inside the body to detect the intensity of ambient light. The body is comprised of a hollow base installed in one lamp socket of the decorative light string to hold the photo-electric control device on the inside. The base includes a ring contact and a tip contact insulated from the ring contact for connection to the two opposite terminals of the lamp socket. A cover is provided on the base, and a transparent cap is fastened to the cover to let outside light pass to the photo-electric control device.

DETAILED DESCRIPTION OF THE PREFERRED EMBODIMENT

Figure 1:
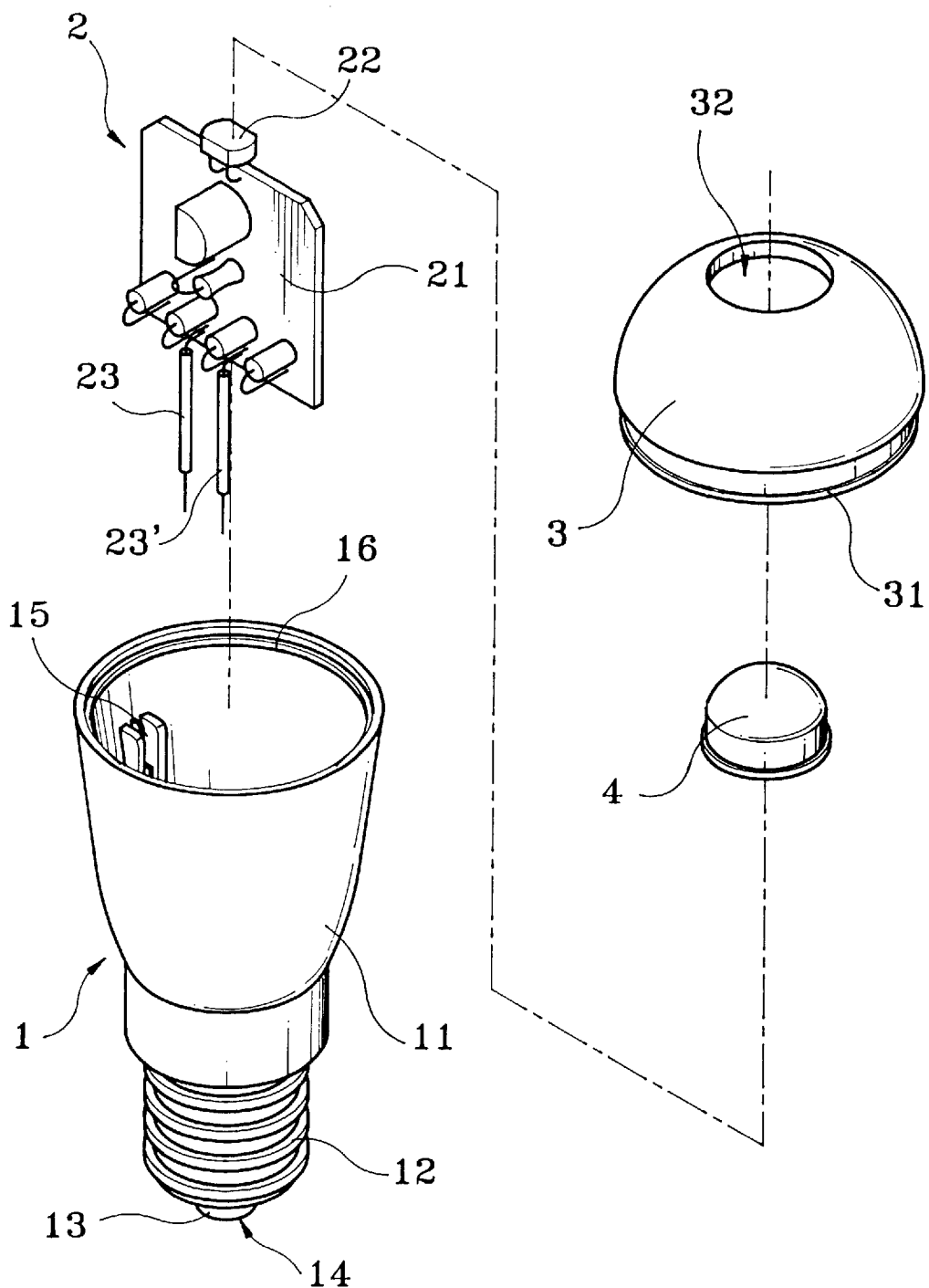
FIG. 1 is an exploded perspective view of an automatic lighting control device according to the present invention.

Referring to FIG. 1, an automatic lighting control device in accordance with the present invention is generally comprised of a base 1, a photoelectric control device 2, a cover 3, and a transparent cap 4. When the base 1 and the cover 3 are fastened together, they are shaped like a lamp bulb. The base 1 comprises a tapered hollow shell 11, a ring contact 12 at the reduced bottom end of the shell 11, an insulator 13 fastened to the end of the ring contact 12, a tip contact 14 is provided at the center of the ring contact 12 and separated from the ring contact 12 by the insulator 13, two symmetrical pairs of longitudinal mounting rails 15 are bilaterally disposed on the inside of the shell 11 for mounting the photoelectric control device 2, and an inside annular flange 16 extends around the inside wall of the shell 11 near its top open end. The cover 3 is covered on the shell 11 of the base 1, and includes a flanged coupling portion 31 fitted into the top open end of the shell 11 of the base 1 and forced into engagement with the inside annular flange 16, and a center opening 32. The transparent cap 4 is fastened to the center opening 32 of the cover 3 for permitting light to pass to the inside of the shell 11 of the base 1. The photoelectric control device 2 comprises a circuit board 21 fastened to the mounting rails 15 inside the shell 11 of the base 1, a photo-resistor 22 mounted on the circuit board 21 and facing the a transparent cap 4, and two conductors 23, 23' extending from the circuit board 21 and respectively connected to the ring contact 12 and tip contact 14 of the base 1.

Figure 2:
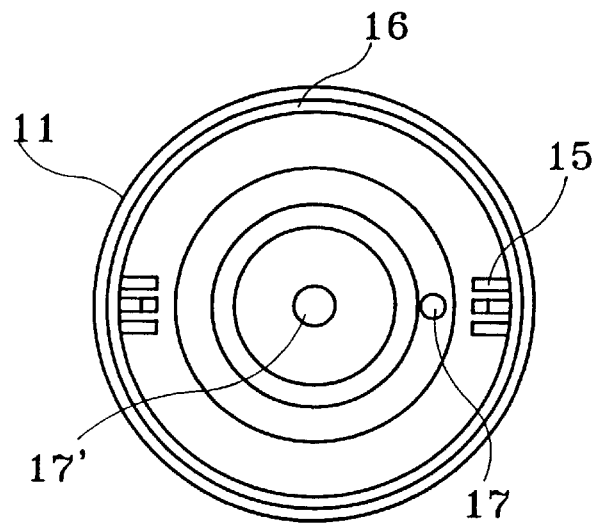
FIG. 2 is an end view of the automatic lighting control device shown in FIG. 1.

Referring to FIG. 2, the shell 11 of the base 1 has two holes 17, 17' respectively connected to the ring contact 12 and the tip contact 14. When the photoelectric control device 2 is installed, the conductors 23, 23' are respectively inserted into the holes 17, 17' and connected to the ring contact 12 and the tip contact 14.

Figure 3:
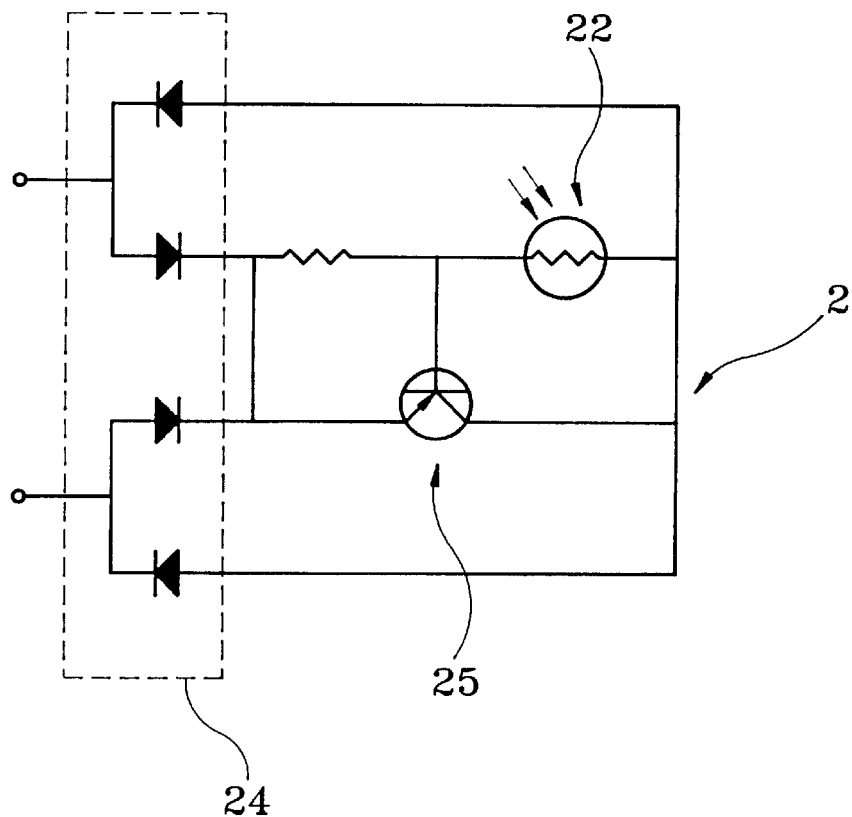
FIG. 3 is a circuit diagram of the photo-electric control device according to the present invention.

Referring to FIG. 3, the photoelectric control device 2 further comprises a bridge rectifier 24 for full-wave rectification, and a transistor 25. The impedance of the photo-resistor 22 is indirectly proportional to the intensity of light, i.e., the impedance of the photo-resistor 22 is relatively higher at night than in the day. During the day, the impedance of the photo-resistor 22 is low, so a large amount of electric current passes to the photo-resistor 22, and a small amount of electric current passes to the base of the transistor 25, therefore the emitter-collector of the transistor 25 is off and the decorative light string is off. During the night, the impedance of the photoresistor 22 is high, so a large amount of electric current passes to the base of the transistor 25 to further electrically connect the emitter and the collector, and therefore the decorative light string is turned on.

Figure 4:
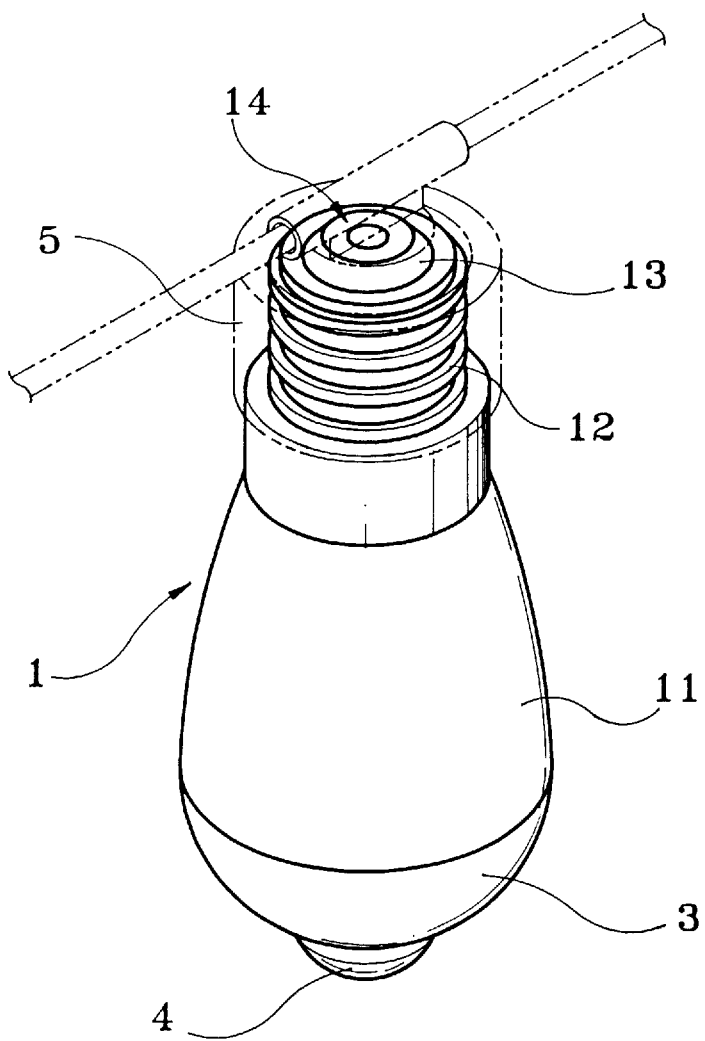
FIG. 4 is a perspective view of the present invention showing the automatic lighting control device installed in one lamp socket of a decorative light string.

Referring to FIG. 4, when in use, the base 1 is directly fastened to one lamp socket 5 of the decorative light string, permitting the ring contact 12 and the tip contact 13 to be respectively connected to the two opposite terminals of the electric circuit. When installed, the automatic lighting control device automatically turns on the decorative string when the intensity of ambient light drops below a predetermined value. Because the automatic lighting control device is shaped like a lamp, its installation does not affect the sense of beauty of the decorative string. In case the automatic lighting control device is damaged, it can be conveniently disconnected from the lamp socket 5 for a replacement.

I claim:

1. An automatic lighting control device for installation in a decorative light string to control an operation of the light string through detection of ambient light intensity, the device comprising:

a) a hollow base for installation in a lamp socket of the light string, the base including a tapered hollow shell having a reduced bottom end and an open top end, a ring contact at the bottom end, an insulator secured to the ring contact, a tip contact secured in a center of the ring contact and separated therefrom by the insulator, and two symmetrical pairs of longitudinal mounting rails bilaterally disposed in an interior of the shell;

b) a photo-electric control device disposed within the interior of the shell and mounted on the pairs of longitudinal mounting rails;

c) a cover secured to the shell and covering the open top end; and d) a transparent cap secured to the cover for admitting exterior light to the photoelectric control device.

2. The automatic lighting control device of claim 1 wherein:

a) the base further includes an annular flange disposed within the interior of the shell adjacent the open top end for mounting the cover; and b) the cover includes a flange coupling portion for forcible engagement with the annular flange.

* * * * *